Sept. 12, 1944.   R. A. BOERSMA   2,358,206
ATTACHING DEVICE
Filed Jan. 17, 1941   2 Sheets-Sheet 1

Inventor
Reemer A. Boersma
By Liverance and
Van Antwerp
Attorneys

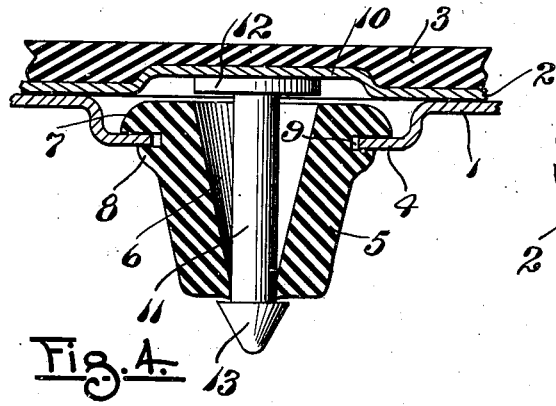
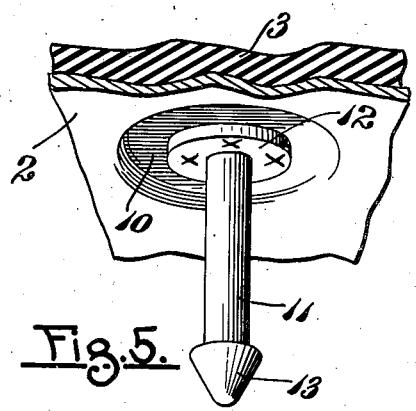
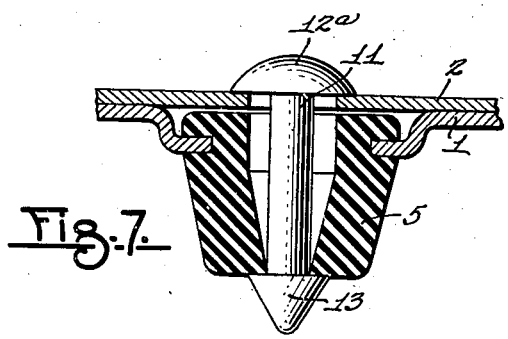
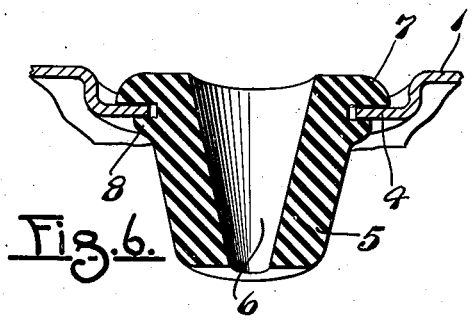
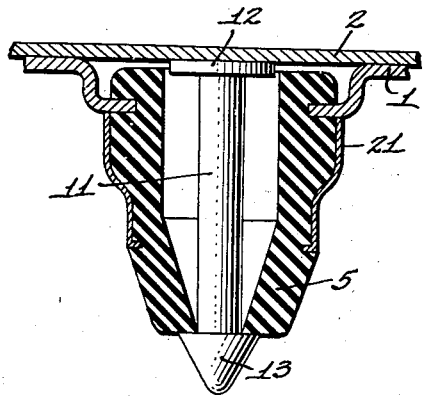

Patented Sept. 12, 1944

2,358,206

UNITED STATES PATENT OFFICE 2,358,206

ATTACHING DEVICE

Reemer A. Boersma, Holland, Mich., assignor to Duffy Manufacturing Company, Holland, Mich., a corporation of Michigan Application January 17, 1941, Serial No. 374,867

10 Claims. (Cl. 189—36)

This invention relates to attaching means which are particularly useful and adaptable in securing running board covers to the base or body of a running board, protective shields to fenders on automobiles, and in many other relations where a simple effective rattle-proof attachment of a part is desired.

With my invention, particularly in connection with the running boards, either those outside of the doors of an automobile or those immediately at the lower portions of the doors and inside the body, it is desirable and is common practice to have a rubber mat generally corrugated or ribbed to cover the running board; and the principal problem heretofore has been to efficiently and economically connect such mat in place and with a secure connection such that there will be no danger of detachment under the relatively rough service to which it is subjected. The rubber mat is ordinarily vulcanized in practice to a sheet metal plate sometimes at the under side of the mat and sometimes interposed within and between the opposed upper and lower sides of the mat. Various bolt and screw attachments and other devices have been used which are awkward to secure in place, time consuming in applying and attaching the mats and which have various other disabilities but which have been used because nothing better has been known.

My invention is concerned with a very practical, simple and effective attaching means which is very readily and economically manufactured and in which the mere application of the mat in place will act to secure the mat effectively, practically and instantaneously without the use of tools. At the same time when the attachment is made danger of rattling is obviated. The attaching means is concealed and is not visible and after the mat is secured in place it presents the appearance at its upper side of an unbroken surface.

The invention may be understood from the following description of preferred forms thereof, taken in connection with the accompanying drawings, in which, Fig. 1 is a fragmentary perspective view illustrative of a portion of an automobile and showing the mat and fender guard as two of the parts with which my invention of attaching device is particularly useful.

Fig. 4 is a fragmentary vertical section illustrating one form of attaching means.

Fig. 5 is a fragmentary perspective view showing one of the headed attaching pins, a plurality of which are secured to and extend downwardly from the metal backing plate of the covering mat.

Fig. 6 is a fragmentary perspective view and vertical section through the rubber grommet connected with the running board body and through which a headed pin illustrated in Fig. 5 is adapted to pass to the position shown in Fig. 4.

Figs. 7 and 8 are vertical sections of modifications of the structure hereafter more fully described.

Like reference characters refer to like parts in the different figures of the drawings.

Figure 1:
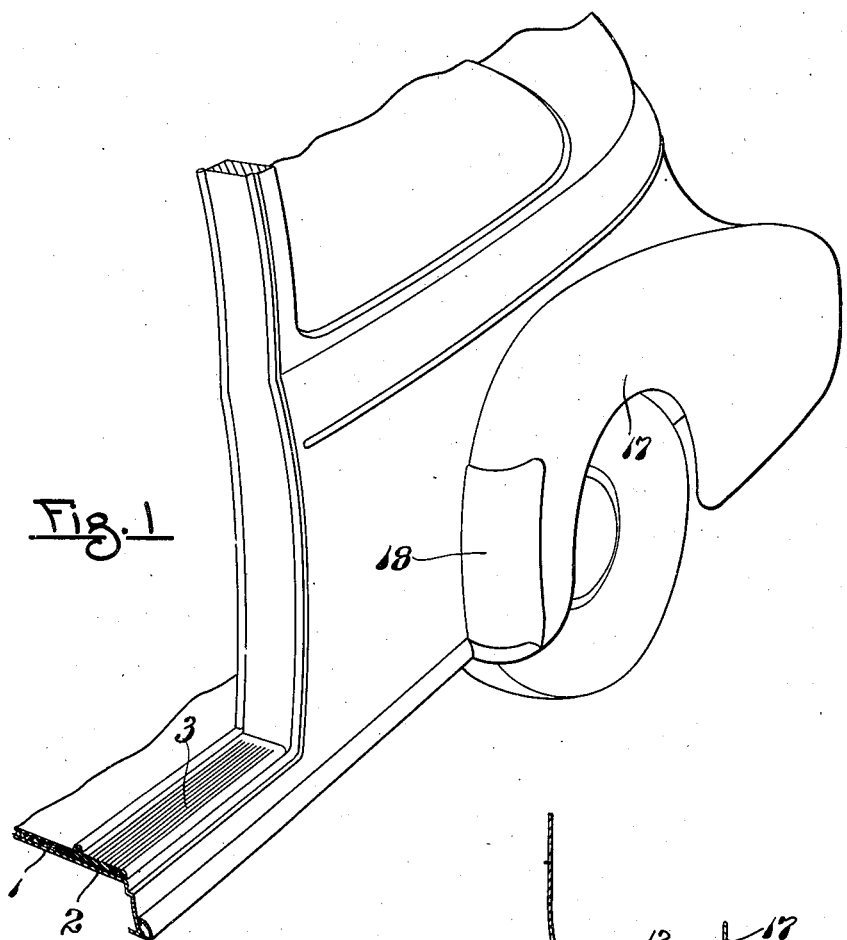
Figure 3:
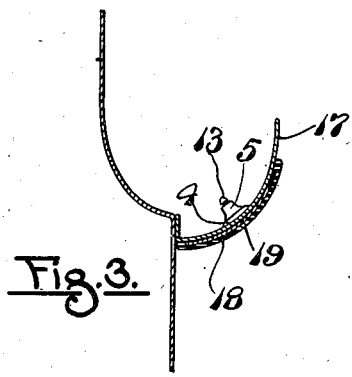
Fig. 3 is a fragmentary vertical section through the fender with the protecting guard attached thereto by means of my invention.
Figure 2:
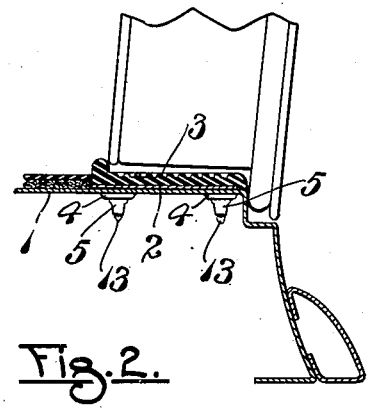
Fig. 2 is a fragmentary vertical section through the running board of an automobile and showing a mat attached thereto at the lower side of a door opening.

The automobile body illustrated fragmentarily in Fig. 1 includes a running board or body part having a horizontal plate portion 1 extending inwardly at the lower side of a door opening and continuing inwardly to provide the floor of the vehicle body. A running board mat is located and is to be secured over the body section 1.

It includes a backing plate 2 of sheet metal to the upper side of which a rubber covering 3 is secured as by vulcanizing to the metal.

The member 1 at a plurality of points in its surface is provided with downwardly pressed recesses 4 making shallow cups, the central portions of the bottoms of which are cut away to provide in each a relatively large circular opening. A grommet or socket 5, of yieldable material, such as rubber or an equivalent plastic material, is formed as an inverted frusto-cone and has a vertical downwardly tapered opening 6 therethrough. Adjacent its upper end it is formed with a continuous annular groove 9 between the shoulders 7 and 8 into which the edge portions of the perforated bottom of the recessed cups 4 extend, as shown in Fig. 4, thereby mounting the grommet securely in place on the base member 1.

The metal backing plate 2 of the mat is formed with upwardly pressed portions 10 of which there will be a number equal to the number of grommets 5 which are mounted on the base plate 1 and which when the mat is attached in place are positioned directly over said grommets.

A vertical pin 11 is formed at its upper end with an enlarged flat head or plate 12 which comes against the under side of an upwardly recessed part 10 and is spot welded or otherwise attached thereto. At the lower end of the pin a conical head 13 is provided having downwardly and inwardly tapered sides. The largest diameter of the head 13 is greater than the smallest diameter of the vertical opening 6 through the grommet 5.

In attaching the mat in place the pins 11 are inserted downwardly through the vertical openings 6 in the grommets 5, the conical sides of the heads 13 engaging against the sides of the opening 6, pressing the yieldable material outwardly until the heads pass below the lower ends of the grommets as shown in Fig. 4. This method of attachment is performed by merely placing the mat in position and forcing it downwardly until the backing plate 2 engages the base plate 1 as in Fig. 4, all of the headed pins 11 being passed through the grommets 5. When this operation has been performed the mat is secured in place.

The structure of Fig. 7 illustrates the device having an exterior annular groove in the socket 5 similar to that shown in Fig. 4 to receive the edge of the plate 1 surrounding the hole therein and the covering member 2 is also provided with a hole through which the stud 11 extends and the stud 11 is provided with an exterior head 12a.

The structure shown in Fig. 8 resembles that of Fig. 4 excepting that the upper part of the opening through the socket is of sufficient diameter to receive the head 12 of the stud 11 and a metallic band 21 surrounds the middle portion of the socket 5. This metallic band serves to strengthen and rigidify the middle portion of the socket and also may be of polished metal to present an ornamental appearance.

It is also apparent that a stone guard for the protection of the front side of fenders, particularly rear fenders, may be attached in the same manner. Such stone guard has an outer rubber or other desired covering 18 secured to a backing plate 19 which may be attached to the metal fender 17 as a base, using the same securing and attaching means.

This construction has been fully developed, tested and tried and has been adopted for use in the automotive trade. It is simple, effective, economical and useful. Considerable time is saved in attaching running board covering mats and stone guards in place. The attachment when once made is certain and secure and is not like bolt and nut attachments wherein the nuts used may loosen and at times be lost. The rubber elements used in the attaching device are of utility in deadening and eliminating rattling and other noises.

Although the attachment is of permanent nature it may be disconnected by spreading the flexible socket to permit withdrawal of the head of the pin or the head may be forced out of the socket by application of sufficient force.

The invention is defined in the appended claims and is to be considered comprehensive of all forms of structure coming within their scope.

I claim:

1. The combination with a plate having an opening therein and a covering device therefor, of an attaching device comprising a socket of elastic plastic material attached to said plate in said opening, and having an opening therethrough, the material surrounding the opening at the bottom thereof having an abrupt shoulder thereon, a stud projecting from said covering device and extending through the opening in said socket and an enlarged head on said stud located beyond said socket.

2. The elements in combination defined in claim 1 in which the opening through said socket is tapered inwardly in a direction away from said covering device and its smaller diameter is substantially equal to the diameter of said stud.

3. The elements in combination defined in claim 1 in which the opening through said socket is tapered inwardly in a direction away from said covering device and its smaller diameter is substantially equal to the diameter of said stud and its diameter in the plane of the opening through said plate is at least as large as the largest diameter of said head.

4. The combination with a plate having an opening therein and a covering device therefor, of an attaching device comprising a socket of elastic plastic material having an opening therethrough and having an exterior annular groove receiving the edge of the opening in said plate, a stud projecting from said covering device and extending through the opening through said socket and an enlarged head on said stud located outside of said socket.

5. The elements in combination defined in claim 4 in which said plate is provided with a depression surrounding the opening therein and the portion of said socket at one side of said annular groove is located within said depression.

6. The elements in combination defined in claim 4 in which the opening through said socket is tapered inwardly in a direction away from said covering device and its smaller diameter is substantially equal to the diameter of said stud.

7. The elements in combination defined in claim 4 in which the opening through said socket is tapered inwardly in a direction away from said covering device and its smaller diameter is substantially equal to the diameter of said stud and its diameter in the plane of the opening through said plate is at least as great as the larger diameter of said head.

8. The elements in combination defined in claim 4 in which said head is tapered inwardly in a direction away from said covering device and said head is provided with an abrupt shoulder contiguous with said stud.

9. A device of the class described comprising, a plate having a depression therein and an opening in said depression, a covering over said plate, and a fastening device including a stud on said covering extending downwardly through said opening, said stud having an enlarged head thereon, a socket having an annular groove therearound to receive the edge of said opening and thereby secure said socket to said plate, and a tapered opening in said socket to receive said stud, said socket being disposed between said head and said plate to thereby secure said covering thereto.

10. A device of the class described comprising, a plate having an opening therein, a covering over said plate, and a fastening device including a stud on said covering extending through said opening, said stud having an enlarged head thereon, a socket having an annular groove therearound to receive the edge of said opening and thereby secure the socket to said plate, and a tapered opening in said socket to receive said stud, said socket being disposed between said head and said plate to thereby secure said covering thereto.

REEMER A. BOERSMA.